United States Patent Office 2,760,872
Patented Aug. 28, 1956

2,760,872

METHOD OF CANNING DATES

Robert P. Ferren, Los Angeles, Calif., assignor to American Can Company, New York, N. Y., a corporation of New Jersey No Drawing. Application September 2, 1954, Serial No. 453,963

5 Claims. (Cl. 99—186)

The present invention pertains to a method of packaging comestibles. More particularly the instant invention pertains to a method of packaging and processing substantially inedible dry dates in containers so as to provide the ultimate consumer with a tender, succulent and nutritious fruit comparable to natural dates.

Dates, although they are all tree ripened vary in moisture content because some dates have dried out more on the palm trees than others. Therefore, after they are picked, the dates are rough graded into three classes: dry dates having approximately from 13% to 18% by weight moisture content; semi-dry dates having a moisture content ranging approximately from 19% to 22% by weight; and natural dates which are plump, smooth dates with full moisture content, about 23% to 30% by weight.

After fumigation and washing, the natural dates are in an edible state and may be packaged and shipped for consumption. However, the dry and semi-dry dates are not considered an edible product. Since these two grades of dates constitute the major proportion (approximately 60%) of the date crop they cannot be discarded; and therefore further processing of these dry and semi-dry dates is necessary to transform them into a marketable, commercial product.

In the past it has been the practice to subject the dry and semi-dry dates to hot water or steam for extended periods of time, i. e. 4 hours or more, in an effort to increase their moisture content to that of natural dates and to break down the tough fibres of the dry and semi-dry fruit. There are numerous disadvantages associated with this procedure, among them being the necessity of large, cumbersome equipment, the long periods of time involved and the excessive handling of the fruit.

Therefore an object of the invention is to provide an improved process for packaging substantially inedible dry and semi-dry dates to yield an edible, tasty and nutritious product.

Another object of the present invention is to provide a quick and efficient method of treating substantially inedible dry and semi-dry dates so that a juicy, succulent, and nutritious fruit comparable to natural dates is obtained.

A further object of the invention is the provision of a carefully controlled process whereby initially dry and semi-dry dates are hydrated to a uniform moisture content.

Still another object of the instant invention is to provide a method of hermetically packing initially dry and semi-dry dates in metal containers and processing the packed containers to yield a succulent, juicy product.

Another object of the present invention is the provision of a method of converting substantially inedible dry and semi-dry dates packed in a sheet metal container into full moisture content, edible dates economically and efficiently.

Numerous other objects and advantages of the invention will be apparent as it is better understood from the following description which is of a preferred embodiment thereof.

The method of the present invention which applicant has discovered and by which the above objects are accomplished is as follows: After fumigating, washing and rough grading into dry, semi-dry and natural dates, the dry and semi-dry dates are given a more accurate grading and separation into batches according to moisture content. The average moisture content of each batch of dates is carefully determined as by means of suitable precision instruments. The dates are then filled into cans along with an amount of water necessary to bring the dates having a predetermined moisture content up to the moisture content of natural dates. Thereafter, the cans are vacuum closed and hermetically sealed and heat processed at an elevated temperature for a time sufficient to hydrate the dates and to pasteurize them.

Determination of the average moisture content of the batches of dates can be carried out in any suitable manner. For example a number of dates selected at random from a batch can be carefully weighed on a microbalance, then dried to remove all of the moisture and thereafter carefully weighed again; the moisture content being the difference between the two weighings. Another method of determining the precise moisture content of the dates which has been found to yield rapid and accurate data is by determining the refractive index of a sample of dates picked at random from the batch.

In this procedure, the sample of dates is comminuted in a suitable manner and the resulting paste is examined in a commercial refractometer. The instrument will immediately give the refractive index of the sample which by means of suitable calibration curves can be translated into moisture content; or the refractometer itself can be calibrated to give readings from which by simple calculation moisture content can be rapidly determined.

Although the moisture content of individual dates within a batch may differ from the average determination described above, each sample examined in the determination is made up of a sufficient number of random picked dates to insure an accurate average value.

The determination of the exact amount of water to be added to the dates after they have been placed in a container to bring these dates up to the required moisture content, i. e. 23% to 30% as in natural dates, is a function of the weight of dates in the container, the average initial moisture content of these dates and the average final moisture content desired in the dates. Each of these factors varies independently of one another.

Thus by using the following formula, the exact weight of water to be added can be readily calculated.

$$A = W\left(\frac{M_2 - M_1}{1 - M_2}\right)$$

where $A$ = the weight of water to be added;
$W$ = the weight of dry or semi-dry dates packed into the can;
$M_2$ = average percentage of moisture in the final hydrated dates; and
$M_1$ = average percentage of moisture in the dates initially.

By taking the range of moisture content of the dry and semi-dry dates (13% to 22%) as the average initial moisture content value, $M_1$ and the range of moisture content of natural dates (23% to 30%) as the hydrated date average moisture content value, $M_2$ it can be calculated by substitution of these values in the above equation that the broad range of the weight of added water is between 1% and 25% by weight of dry or semi-dry dates packed into the container.

After the addition of the predetermined, required amount of water to the dates in the can, a vacuum is drawn on the container and the container sealed. The vacuumizing and sealing of the can should take place rapidly and immediately after the water addition so that none of the added water is lost by evaporation.

It has been found that for satisfactory results a vacuum of 10 in. to 25 in. of mercury and preferably 15 in. to 20 in. of mercury should be developed in the cans. A vacuum in this range is readily obtained with commercial equipment at satisfactory speeds. The minimum vacuum used is sufficient to enable all of the added water to vaporize at heat processing temperatures while the maximum vacuum is not so high as to cause any of the carefully measured amount of added water to be drawn out of the can during the closing operation. It was also found that operating with high vacuums (above 25 in. of mercury) some dates develop ruptured or bloated skins.

The vacuum closing of the can is necessary for a number of reasons. In the heat processing of the dates, temperatures above 190° F. are not desirable as will be discussed more fully hereinafter. However for rapid and efficient hydration of the dates, the added water must be in the form of vapor or steam. By means of maintaining the pressure inside the sealed can below atmospheric pressure it is possible to vaporize the liquid water at the proper heat processing temperature for the dates. Further, vacuumizing removes oxygen from the can which results in a lighter, more desirable end color of the processed dates. When no vacuum is maintained in the cans, the end product has a darker, less appealing color. Also by processing the dates under vacuum, the fruit is in a deaerated condition and therefore is more easily penetrated by the moisture vapor.

The heat treating operation on the packed, sealed cans is carried out preferably by immersion of the cans in a hot water bath. During this operation two distinct processes take place; the hydration of the dates, and the pasteurization of the fruit.

Hydration of the dates takes place in effect in two stages: (1) hydration during heat processing; and (2) hydration during storage. In stage 1 of the hydration process, the moisture vapor formed permeates the entire interior of the container and comes into contact with all of the packed fruit. During this process most if not all of the added water is absorbed by the dates. However each date does not become equally hydrated, some dates having a greater moisture content than others.

Stage 2 of the hydration process takes place after the heat processing during storage of the canned dates. During this stage any small amount of water remaining after stage 1 is then absorbed by the dates. Also during this time the moisture content of each date in the can adjusts itself until an equilibrium condition is reached whereby each date in the can has substantially the same moisture content. The operations of stage 2 take place automatically within a short time.

As pointed out above, the absorption of moisture by the canned dates is greatly facilitated by vacuum maintained in the can. Although the absorbed moisture does not in all cases penetrate the fruit all the way to its pit, it does go through the skin and permeate at least the greater part of the flesh of all the dates.

The principal function of the heat transferred to the inside of the container during heat processing is threefold: to pasteurize the dates; to break down the tough fibres therein; and to inactivate enzymes. The pasteurization and enzyme inactivation are necessary to give the dates a maximum keeping quality in the cans; and the breakdown of fibres improves their texture and taste. Since substantially all of the added water is either in the form of steam or has been absorbed by the dates in the hydration process, pasteurization of the fruit is accomplished in the presence of very little or no liquid whereby the true, natural flavor of the dates is preserved.

The superior product resulting from the method of the present invention depends greatly on the careful control of both the temperature and the time of the heat processing operation. For the proper conditioning of the fruit it has been found that the temperature of the processing medium, e. g. hot water bath, should be within the range of 170° F. to 190° F. and preferably about 175° F. to 180° F. With the preferred temperatures of the processing medium, a date center temperature of about 160° F. to 170° F. for the packed fruit is obtained. These date center temperatures were found to be the optimum temperatures at which all three of the necessary principal functions were accomplished.

The use of temperatures lower than those disclosed may fail to pasteurize and inactive enzymes in the canned dates effectively so that poor keeping quality and a resulting high rate of spoilage occurs. Or even though satisfactory spoilage prevention is obtained, the use of lower heat processing temperatures may not break down the fibres of the dates sufficiently so that a woody, inferior end product rsults. On the other hand dates are very sensitive to high temperatures which cause discoloration of the fruit. To prevent such damage to the fruit, it was found that the maximum temperature of the processing medium should not exceed 190° F. Higher temperatures than this result in overheating and deterioration of the dates adjacent the can walls by the time the dates toward the center of the cans have reached the pasteurization temperature.

The time for which the canned dates are subjected to heat processing depends upon the pasteurization temperature used and the quantity of dates in the containers being processed. Generally, the duration of the heat processing should be as short as possible being only long enough to obtain complete pasteurization and fibre breakdown of the canned fruit, i. e. to bring the center temperature of all of the dates up to about 160° F.–170° F. using heating medium maintained at 170° F. to 190° F.

The table below illustrates the various times used to efficiently heat process different amounts of dates in various sized cans using a hot water bath as the heating medium:

*Table I*

| Can Size | Wt. of Packed Dates (ounces) | Heating Medium Temp. (° F.) | Processing Time (Min.) |
| --- | --- | --- | --- |
| 401 x 300 | 11.75 | 170–190 | 45 |
| 502 x 308 | 22.5 | 170–190 | 70 |
| 603 x 204 | 20.5 | 170–190 | 50 |

The following examples will serve to illustrate further the principles and practice of the present invention but are in no way intended as a limitation thereon. All percentages are by weight.

*Example I*

Eleven and three fourths ounces avoirdupois of fumigated washed dates were filled into a 401 x 300 sheet metal can (4 1/16″ diameter by 3″ high). Previous laboratory tests determined that sample dates from this batch had a refractive index of 1.486 which corresponds to an average moisture content of 20%. To this date filled container was then added 21 ml. of distilled water immediately after which a vacuum of 18″ of mercury was drawn on the can and it was hermetically sealed. The sealed can was immersed in hot water of 180° F. temperature and maintained in the hot bath for 45 minutes. During this time a date center temperature of 160° F. was reached whereby hydration and pasteurization of the canned fruit was accomplished. The can was then removed from the heat processing bath, cooled by immersion in cold water and air dried.

The can after a short storage time was opened and the product inspected. No residual liquid water was found in the can indicating that all of the added water had been absorbed by the dates. The dates themselves had an average moisture content of approximately 25%. They were plump, juicy and succulent and favorably compared in color, texture and flavor to tree ripened natural dates.

*Example II*

The procedure of Example I was repeated identically except that dates, samples of which had a refractive index of 1.505 corresponding to 13% average moisture content, were used and 75 ml. of water was added to the date filled can.

After processing as in Example I, these dates were inspected and found to have an average moisture content of about 30% and to be comparable in all respects to natural dates. Here also there was no free liquid in the can after processing and storage.

*Example III*

Into a 502 x 308 sheet metal can (5 2/16" D x 3 8/16" high) were filled 22.5 ounces avoirdupois of washed, fumigated dates test samples of which had an average moisture content of 22%. Forty-two ml. of distilled water was then added to the can, and the can was closed under 17" of mercury vacuum. The sealed can was then heat processed in hot water at 180° F. to 190° F. for 70 minutes during which time a date center temperature of 160° F. was obtained.

Inspection of these dates, after cooling and storage of the can, revealed that the dates had absorbed all of the added water and that each date had a substantially equal moisture content of approximately 27%. These dates also were juicy and tender and compared favorably to natural dates.

In addition to the superior product produced by the method of the present invention, storage tests of cans packed by this method showed the packed containers to have excellent keeping qualities over very long periods of time. After 17 months storage at 70° F., spoilage was found in none of the containers packed according to the instant invention.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of canning dates comprising placing dates of predetermined initial moisture content and a predetermined amount of water into a container, said amount of water being sufficient to hydrate the dates to a final moisture content of 23% to 30% by weight, sealing said container under a vacuum of from 10" to 25" of mercury, and heat processing the sealed container at a temperature of from 170° F. to 190° F. for a time sufficient to obtain a date center temperature of from 160° F. to 170° F.

2. A method of canning dry and semi-dry dates and transforming said dates into an edible product comprising placing dates of initial moisture content in the range of from 13% to 22% by weight and a predetermined amount of water into a container, said amount of water being sufficient to hydrate said dates to a final moisture content of 23% to 30% by weight, sealing said container under a vacuum of 10" to 25" of mercury, and heat processing the sealed container at a temperature of from 170° F. to 190° F. for a time sufficient to obtain a date center temperature of from 160° F. to 170° F. whereby the dates are hydrated, pasteurized, the enzymes therein are inactivated and the fibres thereof broken down to yield a juicy, edible product.

3. A method of canning dates comprising placing dates of predetermined initial moisture content and a predetermined amount of water into a container, said amount of water being sufficient to hydrate the dates to a final moisture content of from 23% to 30% by weight, sealing said container under a vacuum of from 15" to 20" of mercury, and heat processing the sealed container at a temperature of from 170° F. to 190° F. for a time sufficient to obtain a date center temperature of from 160° F. to 170° F.

4. A method of canning dates comprising placing dates of predetermined initial moisture content and a predetermined amount of water into a container, said amount of water being sufficient to hydrate the dates to a final moisture content of from 23% to 30% by weight, sealing said container under a vacuum of 10" to 25" of mercury, and heat processing the sealed container at a temperature of from 175° F. to 180° F. for a time sufficient to obtain a date center temperature of about 160° F.

5. A method of canning dry and semi-dry dates and transforming said dates into an edible product comprising placing dates of predetermined initial moisture content and a predetermined amount of water into a container, said amount of water being sufficient to hydrate the dates to a final moisture content of 23% to 30% by weight, hermetically sealing said container under a vacuum of from 15" to 20" of mercury, and heat processing the sealed container at a temperature of 175° F. to 180° F. for a time sufficient to obtain a date center temperature of about 160° F. whereby the dates are hydrated to full moisture content, pasteurized, the enzymes contained therein are inactivated and the fibres thereof are broken down to yield a juicy tender edible product.

References Cited in the file of this patent

UNITED STATES PATENTS

| | | |
|---|---|---|
| 2,218,919 | Doyle | Sept. 6, 1938 |
| 2,591,213 | Stupin et al. | Apr. 1, 1952 |
| 2,689,182 | Richert | Sept. 14, 1954 |